United States Patent [19]

Bohen et al.

[11] Patent Number: 5,043,374

[45] Date of Patent: Aug. 27, 1991

[54] HALOGENATED POLYESTER FLAME RETARDANTS FOR POLYPHENYLENE ETHER, POLYOLEFIN AND POLYETHYLENE TEREPHTHALATE RESINS

[75] Inventors: Joseph M. Bohen, King of Prussia, Pa.; Gerald H. Reifenberg, East Windsor, N.J.

[73] Assignee: Atochem North America, Inc., Philadelphia, Pa.

[21] Appl. No.: 432,095

[22] Filed: Nov. 6, 1989

Related U.S. Application Data

[63] Continuation-in-part of Ser. No. 173,518, Mar. 25, 1988, abandoned.

[51] Int. Cl.$^5$ ................................................ C08K 5/12
[52] U.S. Cl. .................................... 524/288; 524/410; 524/411; 524/412
[58] Field of Search ............... 524/410, 411, 412, 288

[56] References Cited

U.S. PATENT DOCUMENTS

| | | | |
|---|---|---|---|
| 2,589,513 | 3/1952 | Smith | 252/301.6 |
| 2,871,215 | 1/1959 | Hyland, Jr. | 260/40 |
| 2,912,409 | 11/1959 | Nischk et al. | 260/45.4 |
| 2,913,428 | 11/1959 | Schoepfle et al. | 260/28.5 |
| 2,935,492 | 5/1960 | Newey | 260/17 |
| 3,094,506 | 6/1963 | Weinberg et al. | 260/46.2 |
| 3,109,831 | 11/1963 | Seiner | 260/75 |
| 3,109,833 | 11/1963 | Seiner | 260/75 |
| 3,196,190 | 7/1965 | Nischk et al. | 260/869 |
| 3,207,731 | 9/1965 | Tousignant et al. | 260/80.5 |
| 3,210,326 | 10/1965 | Tousignant et al. | 260/80.5 |
| 3,251,903 | 5/1966 | Davis | 260/869 |
| 3,254,057 | 5/1966 | Davis | 260/78.4 |
| 3,257,357 | 6/1966 | Stamatoff | 260/47 |
| 3,257,358 | 6/1966 | Stamatoff | 260/47 |
| 3,275,578 | 9/1966 | Pedjae et al. | 521/170 |
| 3,285,995 | 11/1966 | Nametz et al. | 260/865 |
| 3,306,874 | 2/1967 | Hay | 260/47 |
| 3,306,875 | 2/1967 | Hay | 260/47 |
| 3,333,022 | 7/1967 | Reiners et al. | 260/869 |
| 3,383,435 | 5/1968 | Cizek | 260/874 |
| 3,565,812 | 2/1971 | Anderson et al. | 252/182 |
| 3,573,215 | 3/1971 | Nametz et al. | 252/192 |
| 3,585,185 | 6/1971 | Levis, Jr. et al. | 260/210 |
| 3,639,506 | 2/1972 | Haaf | 260/874 |
| 3,639,541 | 2/1972 | Austin et al. | 558/105 |
| 3,642,724 | 2/1972 | Schmidt et al. | 260/78.4 |
| 3,660,351 | 5/1972 | Schmidt et al. | 524/288 |
| 3,733,307 | 5/1973 | Cooper | 260/61 |
| 3,775,165 | 11/1973 | Young et al. | 524/288 |
| 3,793,293 | 2/1974 | Ray et al. | 260/47 |
| 3,804,855 | 8/1974 | Reineke | 560/229 |
| 3,809,729 | 5/1974 | Reinhard | 260/874 |
| 3,839,140 | 10/1974 | Tyler et al. | 161/175 |
| 3,845,022 | 10/1974 | Ray et al. | 260/78.5 |
| 3,845,102 | 10/1974 | Higuchi et al. | 260/479 |
| 3,867,336 | 2/1975 | Fox | 260/45.7 |
| 3,873,567 | 3/1975 | Cyba | 260/326 |
| 3,891,596 | 6/1975 | Roberts et al. | 260/40 |
| 3,919,356 | 11/1975 | Boyer | 260/891 |
| 3,929,866 | 12/1975 | Baldino | 260/475 |
| 3,932,321 | 1/1976 | Maki et al. | 260/17.4 |
| 3,936,414 | 2/1976 | Wright et al. | 260/40 |
| 3,966,682 | 6/1976 | Nelson et al. | 260/75 |
| 3,974,235 | 8/1976 | Cooper et al. | 260/876 |
| 3,979,368 | 9/1976 | Malfroid | 526/11.2 |
| 3,989,653 | 11/1976 | Baldino et al. | 260/2.5 |
| 4,001,188 | 1/1977 | Nelson | 260/75 |
| 4,013,815 | 3/1977 | Dorfman et al. | 428/285 |
| 4,024,093 | 5/1977 | Abolins et al. | 260/17.4 |
| 4,032,509 | 6/1977 | Lee | 260/45.75 |
| 4,034,136 | 7/1977 | Wright et al. | 428/246 |
| 4,048,263 | 9/1977 | Lee | 260/890 |
| 4,073,772 | 2/1978 | Anderson | 260/45.75 |
| 4,094,856 | 6/1978 | Guschl | 260/45.9 |
| 4,096,117 | 6/1978 | Anderson | 260/45.95 |
| 4,098,704 | 7/1978 | Sandler | 524/288 |
| 4,105,628 | 8/1978 | Petersen | 260/45.85 |
| 4,107,232 | 8/1978 | Haaf et al. | 260/876 |
| 4,108,943 | 8/1978 | Lee | 260/878 |
| 4,110,296 | 8/1978 | Wang | 260/30.6 |
| 4,191,685 | 3/1980 | Haaf et al. | 260/45.95 |
| 4,203,931 | 5/1980 | Lee, Jr. | 525/4 |
| 4,205,153 | 5/1980 | Weinstein | 526/292 |
| 4,206,154 | 6/1980 | Lee, Jr. et al. | 260/45.75 |
| 4,274,998 | 6/1981 | Yamashita et al. | 260/45.75 |
| 4,280,951 | 7/1981 | Saito et al. | 260/45.8 |
| 4,298,514 | 11/1981 | Lee, Jr. | 260/29.1 |
| 4,298,517 | 11/1981 | Sandler | 260/31.8 |
| 4,301,062 | 11/1981 | Yamashita et al. | 260/45.75 |
| 4,355,126 | 10/1982 | Haaf et al. | 524/411 |
| 4,374,220 | 2/1983 | Sonnenberg | 524/94 |
| 4,376,837 | 3/1983 | Jenkner et al. | 524/108 |
| 4,397,977 | 8/1983 | Sandler | 524/288 |
| 4,403,057 | 9/1983 | Yamashita et al. | 524/288 |
| 4,415,704 | 11/1983 | Weinstein | 525/76 |
| 4,430,247 | 2/1984 | Austin et al. | 252/182 |
| 4,446,272 | 5/1984 | Fukuda et al. | 524/465 |
| 4,456,720 | 6/1984 | Abolins et al. | 524/176 |
| 4,555,366 | 11/1985 | Rodgers et al. | 260/404.8 |
| 4,762,861 | 8/1988 | Bohen et al. | 524/288 |
| 4,764,550 | 8/1988 | Lovenguth et al. | 524/288 |
| 4,912,158 | 3/1990 | Bohen et al. | 524/288 |
| 4,923,916 | 5/1990 | Bohen | 524/288 |
| 4,923,917 | 5/1990 | Bohen | 524/288 |
| 4,927,873 | 5/1990 | Bohen | 524/288 |
| 4,938,894 | 7/1990 | Bohen et al. | 524/288 |

*Primary Examiner*—Veronica P. Hoke
*Attorney, Agent, or Firm*—Panitch Schwarze Jacobs & Nadel

[57] ABSTRACT

Flame retardancy of polyphenylene ether, polyolefin and polyethylene terphthalate resins and resin blends is increased by blending with the resin a flame retarding amount of a halogenated polyester which is the reaction product of a halogenated phthalic acid or phthalic anhydride with an epoxide or hydroxy compound containing at least two hydroxyl groups. The polyphenylene ether resin may include homopolymers or copolymers of polyphenylene ethers or blends of polyphenylene ethers with vinyl aromatic resins such as styrene polymers and copolymers. The flame retarding polyesters are also effective as processing aids in improving the flowability and moldability of the resins during melt processing.

15 Claims, No Drawings

HALOGENATED POLYESTER FLAME RETARDANTS FOR POLYPHENYLENE ETHER, POLYOLEFIN AND POLYETHYLENE TEREPHTHALATE RESINS

CROSS REFERENCE TO RELATED APPLICATIONS

This application is a continuation-in-part of our copending U.S. application Ser. No. 173,518, filed Mar. 25, 1988 now abandoned for "Halogenated Polyester Flame Retardants For Polyphenylene Ether Resins," and is related to copending U.S. patent applications Ser. No. 173,516 now U.S. Pat. No. 4,927,873 issued May 22, 1990 for "Halophenyl Ester Flame Retardants for Polyphenylene Ether Resins" and Ser. No. 173,487 now U.S. Pat. No. 4,904,795 issued Feb. 27, 1990 for "Halogen Substituted Phthalimide Flame Retardants," both filed on Mar. 25, 1988. This application is also related to U.S. patent application Ser. No. 896,896, filed Aug. 15, 1986 by Ronald F. Lovenguth for "Tetrahalophthalate Esters as Flame Retardants for Polyphenylene Ether Resins," now U.S. Pat. No. 4,764,550, which in turn was a continuation-in-part of U.S. application Ser. No. 777,043, filed Sept. 17, 1985, now abandoned.

This application is also related to the following copending U.S. patent applications: Ser. No. 322,035, filed Mar. 10, 1989, for "Polyhaloaromatic Ester Flame Retardants for Polyolefin Resins"; now abandoned Ser. No. 244,421, filed Sept. 16, 1988, pending for "High Yield Method for Preparation of Dialkyl Esters of Polyhaloaromatic Acids"; and Ser. No. 258,267, filed Oct. 14, 1988, by Joseph M. Bohen for "Fire Resistant Hydraulic Fluids" now abandoned.

The disclosures of the above related applications are incorporated herein by reference. The claimed invention of the present application and the subject matter of the above-identified applications were commonly owned or subject to an obligation of assignment to the same entity at the time the present invention was made.

FIELD OF THE INVENTION

The present invention relates to flame retardant compositions containing at least one halogen-substituted compound and a resin selected from polyphenylene ethers, polyolefins and polyethylene terephthalate. More particularly, the invention is directed to methods and compositions for improving the flame retardancy and processability of such resins using halogen-substituted compounds.

BACKGROUND OF THE INVENTION

Polyphenylene ether (also referred to as polyphenylene oxide or PPO) resins are known in the art as a class of thermoplastics which are characterized by excellent physical properties, including hydrolytic stability, dimensional stability and excellent dielectric properties. In general, they are prepared by the oxidative coupling of a phenolic compound with complex metal catalysts, e.g., a complex copper catalyst. The preparation of polyphenylene ether resins is described in Hay, U.S. Pat. Nos. 3,306,874 and 3,306,875 and U.S. Pat. Nos. 3,257,357 and 3,257,358 of Stamatoff, the teachings of which are incorporated herein by reference.

The high molecular weight polyphenylene ethers are high performance engineering thermoplastics possessing relatively high melt viscosities and softening points, that is, in excess of 250° C., and are useful for many commercial applications requiring high temperature resistance including formation of film, fiber and molded articles.

Cisek, U.S. Pat. No. 3,383,435, which is incorporated herein by reference, discloses polyphenylene ether/styrene resin compositions including rubber modified styrene resin-polyphenylene ether resins wherein the rubber component is of the unsaturated type such as polymers and copolymers of butadiene. Although the styrene resin component improves the moldability of the polyphenylene ethers, these compositions are still difficult to process. Polyphenylene ether/styrene resin blends comprising between about 25 and 75% of polystyrene units are available commercially from the General Electric Company under the NORYL trademark.

Uses and applications of polyolefin resins are known in the art. For example, such uses and applications are discussed in G. Hawley, *Condensed Chemical Dictionary*, 10th Edition (1981), p. 17 (polyacrylate and polymethacrylate esters); p. 435 (ethylene-propylene and ethylene-vinylacetate copolymers); p. 829 (polyisobutylene); pp. 830-831 (polyethylene); p. 835 (poly-4-methylpentene-1); p. 837 (polypropylene); p. 840 (polyvinyl alcohol and polyvinyl acetate).

The preparation and description of polyolefin resins are also known in the art, and are discussed, e.g., in the *Encyclopedia of Polymer Science and Engineering*, 2nd Edition, Vol. 1 (1985), pp. 236-305, (polyacrylate and polymethacrylate esters); Vol. 6 (1986), pp. 383-521 (polyethylenes); pp. 408, 421-422 (ethylene-polyvinyl acetate); pp. 522-564 (ethylene-propylene copolymers); Vol. 8, pp. 423-448 (polyisobutylene); Vol. 9, pp. 707-718 (poly-4-methylpentene-1); *Encyclopedia of Chemical Technology*, 3rd Edition, Vol. 23 (1983), pp. 817-865 (polyvinyl alcohol and polyvinyl acetate).

The preparation and description of polyethylene terephthalate resins are discussed in *Encyclopedia of Polymer Science and Engineering*, 2nd Edition, Vol. 12, pp. 217-256.

The uses of brominated and/or chlorinated compounds by themselves or in combination with other materials such as organic phosphates, boron compounds, etc., as flame retardants for polyphenylene ether resin compositions are well known in the art and are exemplified by U.S. Pat. Nos. 3,257,357; 3,639,506; 3,733,307; 3,809,729; 3,867,336; 3,919,356; 3,936,414; 3,974,235; 3,939,531; 4,024,093; 4,034,136; 4,073,772; 4,094,856; 4,096,117; 4,107,232; 4,191,685; 4,203,931; 4,206,154; 4,274,998; 4,280,951; 4,298,514; 4,301,062; 4,355,126; 4,403,057; 4,446,272; and 4,456,720. The aforesaid patents are incorporated herein by reference.

Further, tetrahalophthalate esters have been used as flameproofing materials. For example, U.S. Pat. No. 4,098,704 describes the use of these materials as textile finishing agents. U.S. Pat. Nos. 4,298,517 and 4,397,977 disclose these compounds as flame retardants for halogenated resins. However, prior to the inventions of the above-related applications of Lovenguth, it was unknown to use these compounds as flame retardants or processing aids for polyphenylene ether resins.

Polyhalophenyl esters have been used as flame proofing materials either as additives to plastics or incorporated as part of the polymer backbone. Examples of the latter are polyhalophenyl esters of polymerizable acids such as 2,4,6-tribromophenyl methacrylate, pentabromophenyl methacrylate, 2,4,6-tribromophenyl acrylate, pentachlorophenyl methacrylate, pentabromophenyl acrylate, trichlorophenyl acrylate, tetrabromoxylene di(methacrylate), etc., which are exemplified by U.S. Pat. Nos. 3,207,731; 3,210,326; 3,845,102; 3,932,321; 4,032,509; 4,048,263; 4,105,628; 4,108,943; 4,110,296; 4,205,153; and 4,415,704, the disclosures of which are incorporated herein by reference.

Examples of polyhalophenyl esters that have been used as additives to plastics are pentabromophenyl 2,4,4,4-tetrachlorobutyrate, bis(2,4,6-tribromophenyl) tetrachloroterephthalate, pentabromophenyl o-(2,4,6-tribromophenoxymethyl) benzoate, pentabromophenyl o-(pentachlorophenylthiomethyl) benzoate, bis(2,4,6-tribromophenyl) isophthalate, bis(pentabromophenyl) terephthalate, 2,4,6-tribromophenyl 3,5-dibromobenzoate, 2,4,6-tribromophenyl tribromopivalate, pentachlorophenyl tribromopivalate, bis(2,4,6-trichlorophenyl) phthalate, bis(2,4,6-tribromophenyl) phthalate, pentachlorophenyl acetate, bis(2,4,6-tribromophenyl) sebacate, and pentabromophenyl acetate, etc., which are exemplified by U.S. Pat. Nos. 3,275,578; 3,660,351; and 3,804,885 as well as Eur. Pat. Appl. EP73539; Japan Kokai JP 55/56140; 53/120755; 51/86554; 51/23545; 50/90639; 50/95353; 50/87146; 48/101443 and 47/46478; and Ger. Offen. DE 2,554,513 and DE 2,161,526, the disclosures of which are incorporated herein by reference. However, no teachings have been found which show the use of these compounds as flame retardants or processing aids for polyphenylene ether resins or PPO resin blends.

Halogen-substituted polyesters have also been used as flame proofing materials. They have been prepared by either (a) the reaction of one or more at least partially halogenated dicarboxylic acids or anhydrides with a compound or compounds containing at least two hydroxyl groups or (b) the reaction of an at least partially halogenated dicarboxylic acid anhydride with one or more epoxides in the presence of a variety of catalysts. Examples of the former have been disclosed in the following patents, which are incorporated herein by reference: U.S. Pat. Nos. 2,871,215; 2,912,409; 2,913,428; 3,094,506; 3,109,831; 3,019,833; 3,196,190; 3,285,995; 3,333,022; 3,573,215; 3,585,185; 3,639,541; 3,642,724; 3,793,293; 3,929,866; 3,989,653; 4,013,815; 4,376,837; 4,555,366; Canadian Patent 741,390 and British Patent 988,304. Examples of the latter are the following, which are incorporated herein by reference: U.S. Pat. Nos. 2,589,513; 2,935,492; 3,251,903; 3,254,057; 3,565,812; 3,845,022; 3,891,596; 3,979,368; 4,430,247; and 4,555,366.

However, in general these compounds have been mixed polyesters in which halogenated acid components have been mixed with non-halogenated acid components (e.g., dicarboxylic acids or phthalic or maleic anhydrides) to improve flame retardancy of the resulting esters. Moreover, to applicant's knowledge, there has been no reference to the use of these compounds as flame retardants for polyphenylene ether resins or PPO resin blends.

Halogen substituted phthalimides have also been used as flame-proofing materials. For example, U.S. Pat. No. 3,873,567 describes the use of these materials as flame retardants in polymers, etc., especially polypropylene. U.S. Pat. No. 4,374,220 describes the use of halosubstituted mono- and bis-phthalimides for polyethylene, polypropylene, ethylene-propylene copolymers, etc. British Patent 2,114,127 describes carbonate-substituted polyhalophthalimides as flame retardants for polyethylene, among others.

BRIEF SUMMARY OF THE INVENTION

According to the present invention, flame retardant compositions are provided in which a resin of polyphenylene ether, polyolefin or polyethylene terephthalate, or blends of the foregoing with each other or with other resins, contains an amount of halogenated polyester effective to increase the flame retardancy of the resin, the halogenated polyester being the reaction product of a halogenated phthalic acid or anhydride and a dihydroxy compound or epoxide. The polyester preferably contains at least about 25 weight percent bound halogen, preferably bromine or chlorine, with at least about 35 weight percent bound bromine being particularly preferred.

The halogenated polyester may be present in the resin or resin blend in a weight ratio in the range of about 1:100 to about 1:2. The polyphenylene ether resin may be present as a homopolymer or copolymer of polyphenylene ether, or more preferably in the form of a blend of polyphenylene ether homopolymer and/or copolymer with a vinyl aromatic resin such as polystyrene or a styrene copolymer. Any of the polyolefin or polyethylene terephthalate resins known in the art, as well as blends of these resins, may be used in the present invention.

Also according to the present invention, the processability of polyphenylene ether, polyolefin, and polyethylene terephthalate resins or resin blends is improved by the addition of the same halogenated polyesters which improve the flame retardancy of the resins.

DETAILED DESCRIPTION OF PREFERRED EMBODIMENTS

In general, the polyphenylene ether resins to which the present invention are directed are of the type described in the U.S. patents of Hay and Stamatoff, described above, as well as copolymers of these resins, such as the type described in U.S. Pat. No. 3,733,307. In addition, the invention is directed to blends of PPO homopolymer and/or copolymer resins with vinyl aromatic resins, such as those of the type described in Cisek U.S. Pat. No. 3,383,435, referred to above.

Preferred polyphenylene ether resins that may be used in the present invention include the following:

(1) Homopolymers having repeated structural units of the formula:

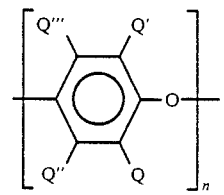

where Q, Q', Q", Q''' are independently hydrogen, hydrocarbon radicals, or halohydrocarbon radicals having at least two carbon atoms between the halogen atom and phenyl nucleus, or Q', Q", and Q''' may be halogen, with the proviso that Q and Q' are preferably free of tertiary carbon atoms; and n represents the total number of monomer units and is preferably an integer of at least 10. Examples of polyphenylene ethers corresponding to the above formula can be found in the above-referenced patents of Hay and Stamatoff.

(2) Copolymers with repeating structural units of the formula:

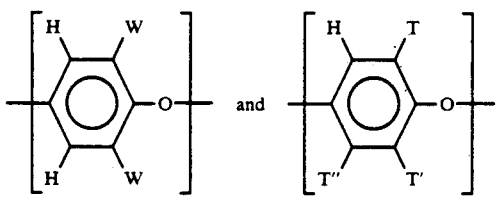

where W may be methyl, Cl, Br, or I; and T, T' and T" are independently alkyl of 1 to 3 carbons, aryl, alkaryl, haloaryl, or arylalkyl of from 6 to 12 carbons. Examples of these copolymers can be found in U.S. Pat. No. 3,733,307.

(3) Blends of (1) and/or (2) with vinyl aromatic resins wherein at least 10% by weight of the blend is derived from vinyl aromatic monomers of the formula:

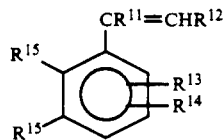

where $R^{11}$ and $R^{12}$ are independently lower alkyl or alkenyl groups of from 1 to 6 carbon atoms or hydrogen; $R^{13}$ and $R^{14}$ are independently chloro, bromo, hydrogen or lower alkyl of from 1 to 6 carbon atoms; $R^{15}$ and $R^{16}$ are independently hydrogen or lower alkyl or alkenyl groups of 1 to 6 carbons, or $R^{15}$ and $R^{16}$ may be concatenated together with hydrocarbyl groups to form a naphthyl group. Moieties that may be copolymerized with the units of the vinyl aromatic monomer include those having the general formula:

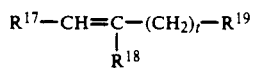

wherein $R^{17}$ and $R^{18}$ are independently hydrogen, halogen, alkyl of 14 carbon atoms, or carboalkoxy, or $R^{17}$ and $R^{18}$ taken together represent an anhydride linkage (—COOOC—), and $R^{19}$ is hydrogen, vinyl, alkyl or alkenyl having 1 to 12 carbon atoms, cycloalkyl, carboalkoxy, alkoxyalkyl, alkyl-carboxy, ketoxy, halogen, carboxy, cyano or pyridyl; and t is a whole number in the range of about 0 to 9.

The general formula set forth for the vinyl aromatic monomer is intended to include by way of example, homopolymers such as polystyrene and monochloropolystyrene, the modified polystyrenes, such as rubber modified, high impact polystyrene and the styrene containing copolymers, such as the styrene-acrylonitrile copolymers, styrene-butadiene copolymers, styrene-acrylonitrile-alkyl styrene copolymers, styrene-acrylonitrile-butadiene copolymers, polymethylstyrene, copolymers of ethylvinylbenzene and divinylbenzene, styrene-maleic anhydride copolymers, styrene-butadiene-styrene block copolymers, styrene-butadiene block copolymers, and styrene-butadiene-styrene maleic anhydride block copolymers. The preferred vinyl aromatic resins are the halogen-free vinyl aromatic resins.

The preferred polyphenylene ether resins are blends of (1) and (3) above. Especially preferred are those blends in which the vinyl aromatic resin is polystyrene or a copolymer of styrene and 1,3-butadiene.

The polyolefin resins which may be made flame retardant by incorporating esters according to this invention, are any readily flammable polyolefin resins or resin blends including polyolefins. Exemplary of the polyolefins and blends which can be flame-proofed include saturated, unsaturated, linear, atactic, crystalline or non-linear amorphous polymers, copolymers, terpolymers, etc. For example, there may be used polyethylene, polypropylene, poly(4-methylpentene-1), polybutene-1, polyisobutylene, ethylene-propylene-copolymer, cis-1-4-polyisoprene, ethylene-propylene-dicyclopentadiene terpolymer, etc., and blends of these polymers with each other or with other polymers.

Particularly preferred polyolefin resins which may be used in this invention are (a) polyethylene, which includes all grades, such as low density, linear low density, and high density grades; (b) polypropylene; (c) ethylene-propylene copolymers; (d) ethylene-vinyl acetate copolymers; (e) polyvinyl acetate; (f) polyvinyl alcohol; (g) poly-4-methylpentene-1; (h) polyisobutylene; and substituted polyolefins, such as (i) polyacrylate esters; and (j) polymethacrylate esters. Combinations of any of the above polyolefins (a–j) by themselves or blends with polystyrene, styrene-butadiene copolymers, chlorinated polyethylene, polyvinyl chloride, or engineering thermoplastics, such as acrylonitrile-styrene-butadiene (ABS), polybutylene terephthalate (PBT), polyphenylene oxides-high impact polystyrene (PPO-HIPS), etc., are conceived as falling within the scope of this invention.

The polyphenylene ether, polyolefin and polyethylene terephthalate resins and resin blends are compounded with halogen-substituted polyesters which are the reaction product of a halogen-substituted phthalic acid or halogen-substituted phthalic anhydride with a hydroxy compound which contains at least two hydroxyl groups or with an epoxide. In contrast to the prior art referred to above, the polyesters of the present invention preferably do not contain non-halogenated acid components. For ease of convenience herein, these halogen-substituted polyesters will be referred to simply as halogenated polyesters or halogenated phthalates. As will be described more fully below, these halogenated phthalates serve as both flame retardants and processing aids for the resins and resin blends.

The halogen substituents on the phthalate esters useful in the present invention are preferably selected from chlorine and bromine, with bromine being particularly preferred. Moreover, it is desirable that the halogen substituents comprise a large percentage of the polyester, preferably at least about 25 weight percent of the polyester, and more preferably at least about 35 weight percent of the polyester. In the case of the preferred bromine-substituted polyesters described below, the bromine may comprise in excess of 40 or 45 weight percent of the polyester. The high weight percent of halogen is important since the halogen is believed to be largely responsible for the flame retarding properties.

Preferred halogenated polyesters useful as flame retardants and/or processing aids in the compositions of the present invention include phthalate esters of the following formula:

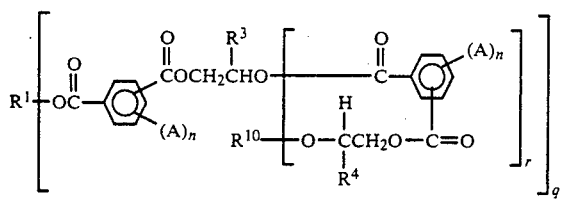

wherein (a) the ring substituents can have all possible isomeric arrangements or positions;

(b) $R^1$ is selected from alkyl or substituted alkyl of 1 to 30 carbons, alkenyl or substituted alkenyl of 2 to 22 carbons, polyhydroxyalkyl of 3 to 12 carbons,

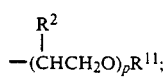

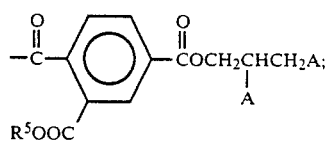 

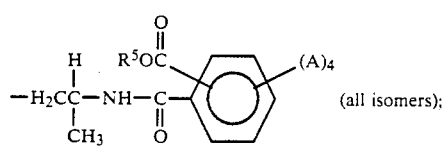

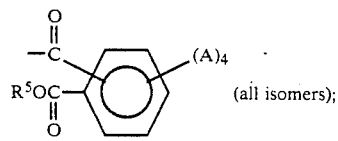

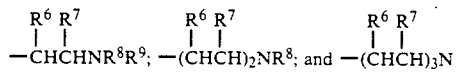

(c) $R^2$ is independently H or $CH_3$;

(d) $R^3$ and $R^4$ are independently hydrogen, $C_1$ to $C_{18}$ alkyl, which may optionally be substituted by halogen, —OH, —$OR^5$, or

(e) $R^6$, $R^7$, $R^8$ and $R^9$ are independently hydrogen or an alkyl group of 1 to 22 carbons;
(f) p is an integer of 0 to 50;
(g) q is an integer of 1 to 6;
(h) r is greater than 0 to about 50;
(i) A is Cl or Br;
(j) n=1 to 4;
(k) $R^{10}$ is hydrogen,

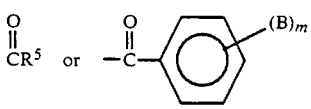

where B is halogen, —$OR^5$,

and m=1 to 5;
(l) $R^5$ is alkyl of 1 to 22 carbons; and
(m) $R^{11}$ is

or $R^5$, with the proviso that when p=0, $R^{11}$ is not $R^5$; provided that when n=4, q=1, and $R^{10}$ is hydrogen, r is not one.

Preferred halogenated polyesters useful in this invention are those of the above formula wherein $R^1$ is hydrogen or alkyl or substituted alkyl of 1 to 22 carbons; $R^3$ and $R^4$ are independently hydrogen, —$CH_3$, —$CH_2Cl$, —$C_2H_5$, —$C_4H_9$ or $C_8H_{17}$; A is Br; p is 0 to 20; q is 1 to 6; r is 0.10 to 5; and n=2 to 4. The halogenated polyesters of the above formula may be made by known methods, such as those described in the patents referred to above under "Background of the Invention," and as exemplified in the specific Examples 1-11 below.

Representative halogen-substituted polyester compounds useful in practicing this invention include the following (where A is Br or Cl):

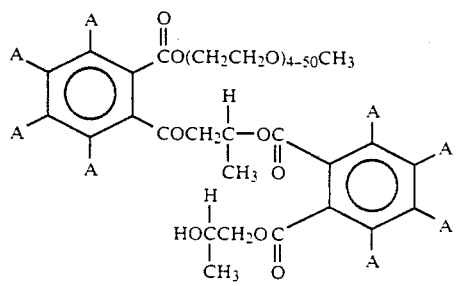

-continued
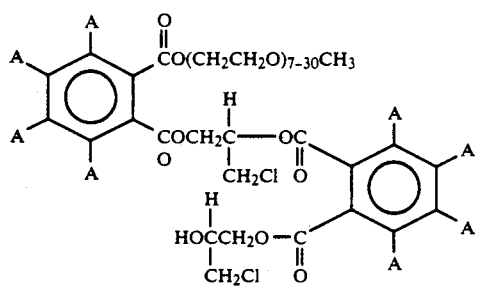
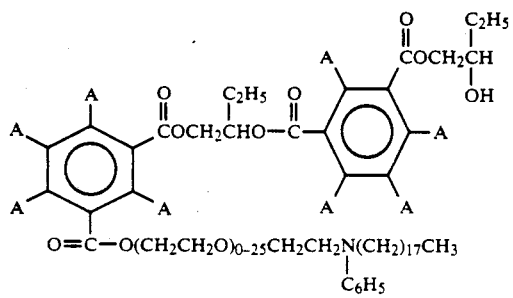
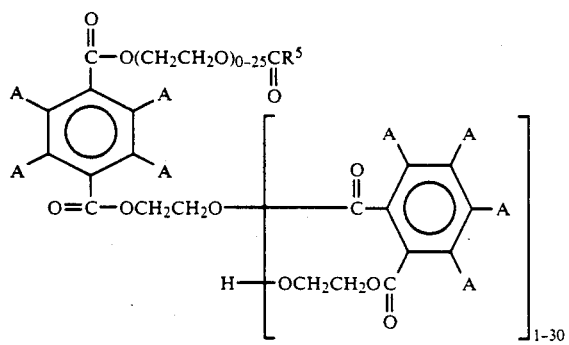
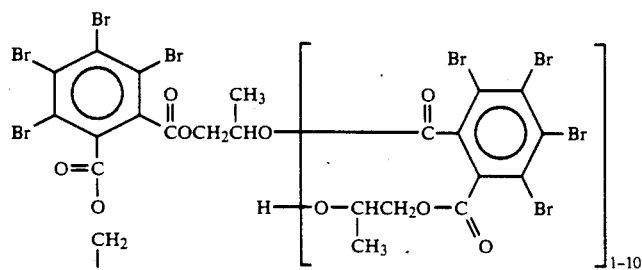
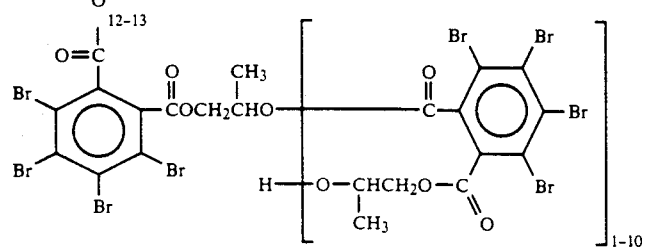

-continued
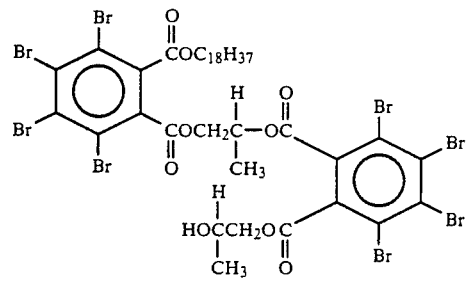
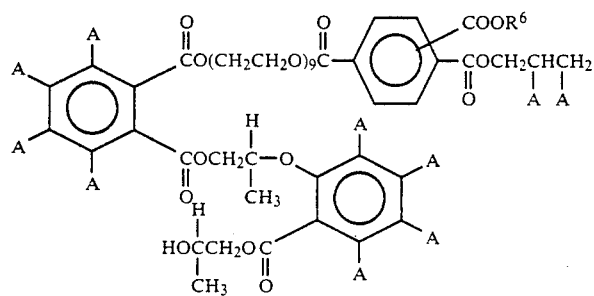
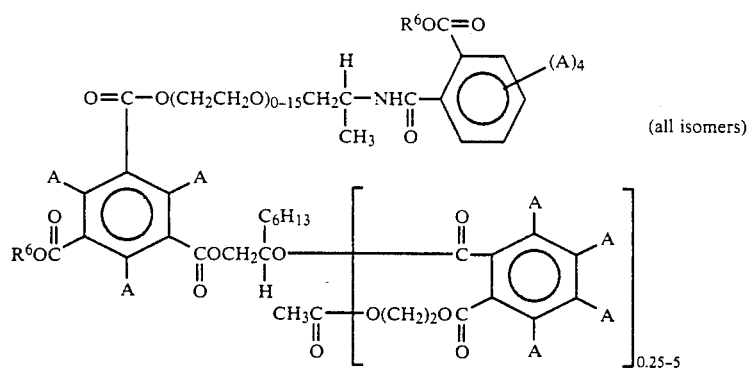
(all isomers)
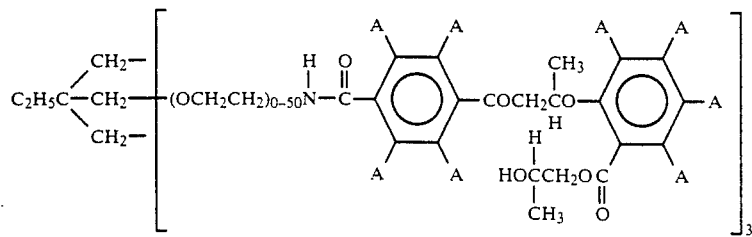

-continued
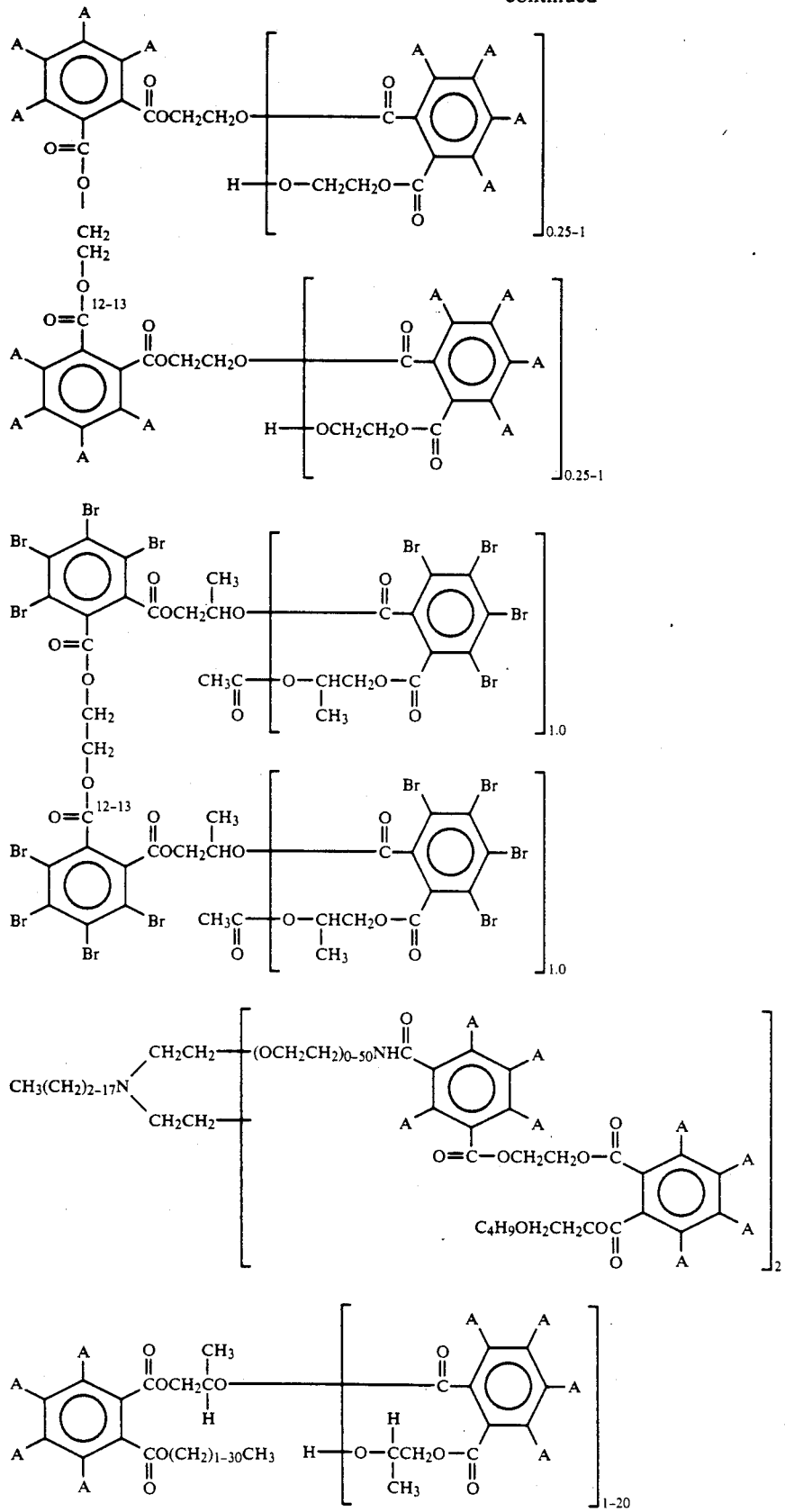
In practicing this invention, the halogenated polyester is added to the polyphenylene ether, polyolefin or polyethylene terephthalate resins or resin blends in any convenient manner, such as by blending or extruding in order to produce a uniform composition. Flame retardant synergists such as antimony oxide ($Sb_2O_3$) may also be added if desired. In addition, other additives such as thermal stabilizers, ultraviolet stabilizers, reinforcing agents, organic polymers, mold release agents, blowing agents, colorants, and the like may also be optionally included. A further advantage of the halogenated polyesters as used in this invention is their improved compatibility with the present resins, for example, NORYL resins (blends of polystyrene and polyphenylene ethers containing 25 to 75% of the former).

Another aspect of this invention is that the compositions may optionally contain other bromine and/or chlorine flame retardant compounds such as those that are well known in the art. Examples of such compounds include those described as optional flame retardants in our copending application Ser. No. 322,035.

The halogenated polyester is added to the resins or resin blends in an amount effective to increase the flame retardancy of the composition. Generally, ratios of halogenated polyester to resin in the range of about 1:100 to about 1:2, and preferably about 1:20 to 1:4, will be effective depending upon the particular application. A particular advantage of the present invention is that the higher molecular weight and lower volatility of the halogenated polyesters, compared to other halogenated flame retardants, result in less evaporation and loss of the halogenated flame retardant during resin processing, but without reducing the high halogen content which is important to the effectiveness of the flame retarding agent.

In addition to providing increased flame retardancy to the polyphenylene ether, polyolefin and polyethylene terephthalate resins and resin blends, the halogenated polyesters useful in the present invention are advantageous as processing aids to improve the flowability or moldability of the resins during melt processing, such as extrusion or injection molding. The halogenated polyesters of the above formula are also completely compatible with the resins and may serve (particularly with polyolefins) as tackifiers, mold release agents, plastisols, adhesives, plasticizers, polymer additives, and aids in preventing melt fracture. Moreover, it has been unexpectedly found that the esters improve the impact strength of the polyolefins.

The invention will now be illustrated in more detail with reference to the following specific, non-limiting examples.

EXAMPLE 1

A mixture of 75.3 g (containing 2.2% hydroxyl groups) of ω-methylhepta (oxyethylene)-2-hydroxypropyl tetrabromophthalate, 45.16 g (0.10 mole) tetrabromophthalic anhydride, and 50 mg potassium acetate, was heated at 125° C. for 5.5 hours. After cooling to room temperature, 11.27 g (0.18 mole) of propylene oxide was added, and the mixture was reheated to 85° C. and kept at this temperature for 3 hours. The excess propylene oxide was removed by vaporization to give a colorless, opalescent, viscous liquid in essentially quantitative yield. Calcd. %Br, 46.1 Found %Br, 46.7. Analytical data is consistent with the following assigned structure:

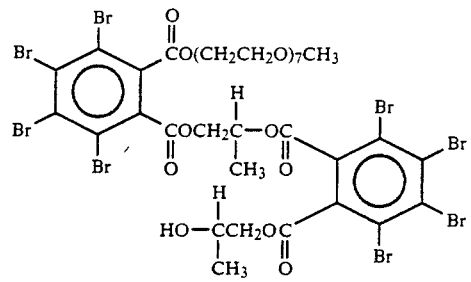

EXAMPLE 2

A mixture of 129.25 g (0.25 mole) Methoxy Carbowax 550 (Union Carbide trademark for methoxy poly-(ethylene glycol), M.W. =550), 231.86 g (0.50 mole) of tetrabromophthalic anhydride, 0.24 g of potassium acetate and 250 ml of toluene were refluxed for 6 hours. After cooling to 50°-60° C., 70.58 g (1.2 moles) of propylene oxide was added in 15 minutes. The mixture was heated to 85° C. and kept at this temperature for 6 hours. After filtration, the solvent and excess of propylene oxide were removed by vaporization to give the product as an opalescent, viscous liquid in essentially quantitative yield. Calcd. %Br, 41.0. Found %Br, 40.9. Analytical data is consistent with the following assigned structure:

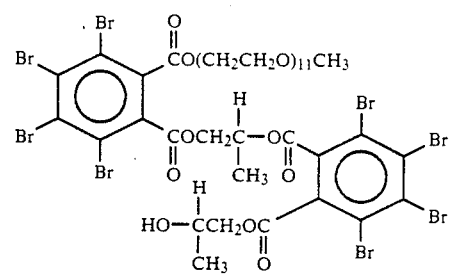

EXAMPLE 3

The compound below was prepared by the procedure outlined in Example 2 except that Methoxy Carbowax 750 (poly(ethylene glycol), M.W. =750) was used in place of Methoxy Carbowax 550. The product was a slightly yellow, viscous liquid. Calcd. %Br, 36.7. Found %Br, 36.5. Analytical data is consistent with the following assigned structure:

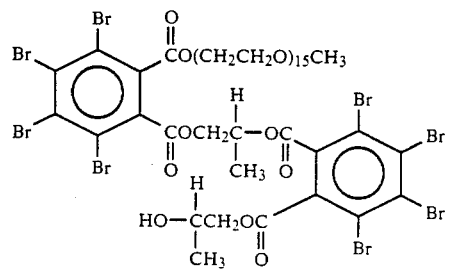

EXAMPLE 4

The compound below was prepared by the procedure outlined in Example 2 except that epichlorohydrin was used inplace of propylene oxide. The product was a slightly yellow, opalescent, viscous liquid. Calcd. %Br, 39.2; %Cl, 4.35. Found %Br, 39.1; %Cl, 4.40. Analytical data is consistent with the following assigned structure:

into the mixture in 45 minutes. Heating continued for 2 hours. After cooling to room temperature, the reaction mixture was collected, and the solvent was removed by vaporization to give the product in essentially quantitative yield. The product was a light yellow, viscous liquid. Calcd. %Br, 42.5. Found %Br, 43.0. Analytical data is consistent with the following assigned structure:

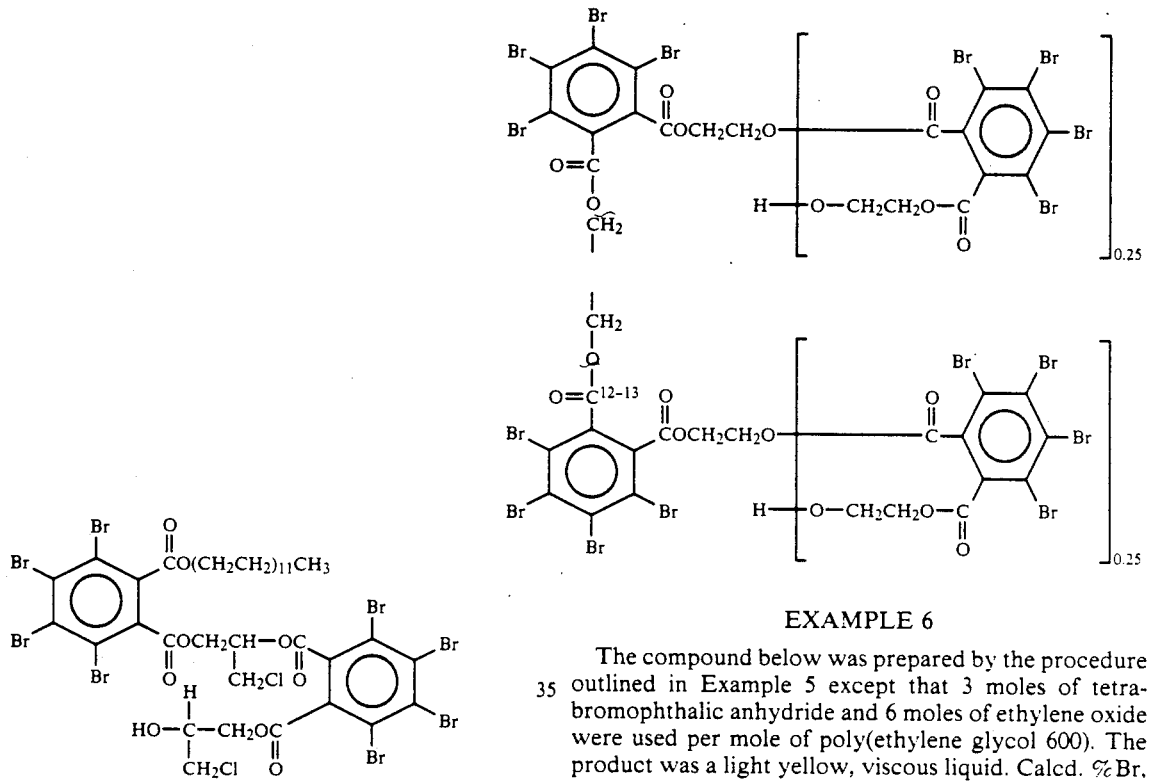

EXAMPLE 6

The compound below was prepared by the procedure outlined in Example 5 except that 3 moles of tetrabromophthalic anhydride and 6 moles of ethylene oxide were used per mole of poly(ethylene glycol 600). The product was a light yellow, viscous liquid. Calcd. %Br, 44.9. Found %Br, 44.6. Analytical data is consistent with the following assigned structure:

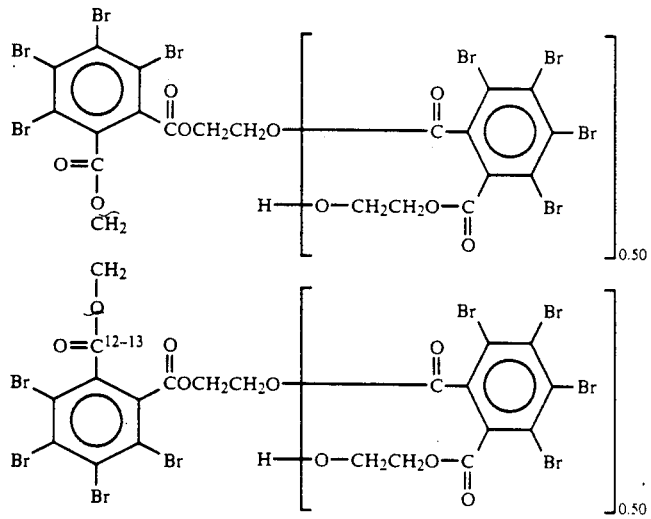

EXAMPLE 5

Into a 1 gallon, stainless steel, stirred autoclave, were charged 855.4 g (1.40 moles) of poly(ethyleneglycol 600), 1623.0 g (3.51 moles) of tetrabromophthalic anhydride, 1.7 g of potassium acetate, and 1000 ml of toluene. The mixture was heated to and kept at 120° C. for 6 hours. 328.3 g (7 moles) of ethylene oxide was pumped

EXAMPLE 7

The compound below was prepared by the procedure outlined in Example 5 except that 4 moles of tetrabromophthalic anhydride and 8 moles of ethylene oxide were used per mole of poly(ethylene glycol 600). The product was a yellow, highly viscous liquid. Calcd. %Br, 48.4. Found %Br, 49.9. Analytical data is consistent with the following assigned structure:

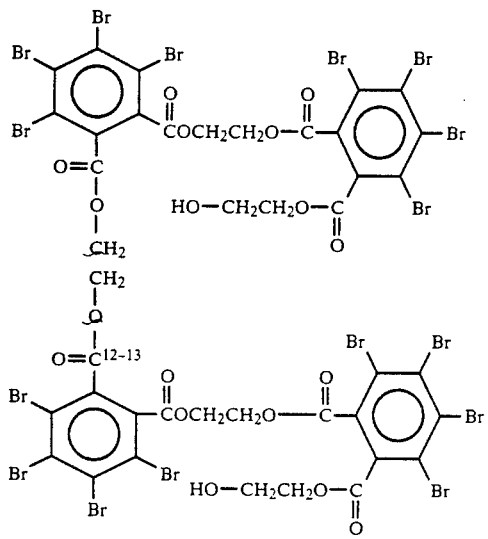

EXAMPLE 8

This compound was prepared by the procedure outlined in Example 7 except that propylene oxide was used in place of ethylene oxide. The product was a yellow, highly viscous liquid. Calcd. %Br, 47.4. Found %Br, 46.3. Analytical data is consistent with the following assigned structure:

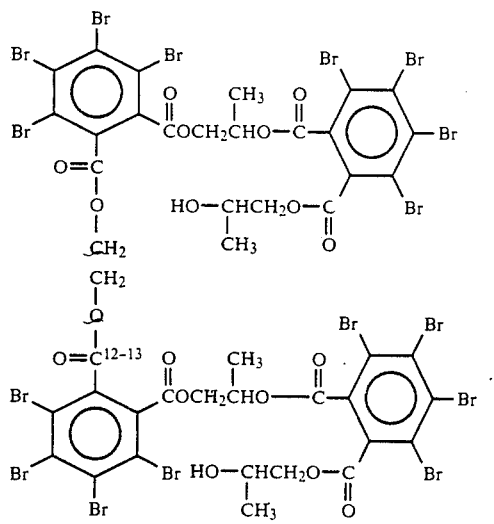

EXAMPLE 9

The compound below was prepared by the procedure outlined in Example 8 except that octadecyl alcohol was used in place of poly(ethylene glycol 600). The product was a yellow, highly viscous liquid. Calcd. % Br, 48.6. Found % Br, 46.5. Analytical data was consistent with the following assigned structure:

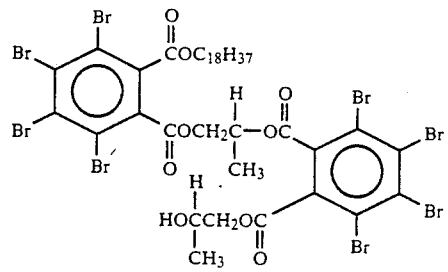

EXAMPLE 10

A mixture of 251.7 g (containing 1.52% hydroxy groups) of the product of Example 7 and 250 ml of toluene was warmed to 50° C. until the reactant dissolved. After cooling to room temperature, 18.55 g (0.2 mole) of acetyl chloride was added in one portion, and then 25.1 g (0.25 mole) of triethylamine was added in 10 minutes. During this period the temperature of the reaction mixture rose from 23° C. to 62° C. The mixture was heated to reflux and kept there for four hours. After filtering the reaction mixture, the solvent was removed to give a dark red-yellow, viscous liquid in 92% yield. Calcd. % Br, 46.9. Found % Br, 47.1. Analytical data was consistent with the following assigned structure:

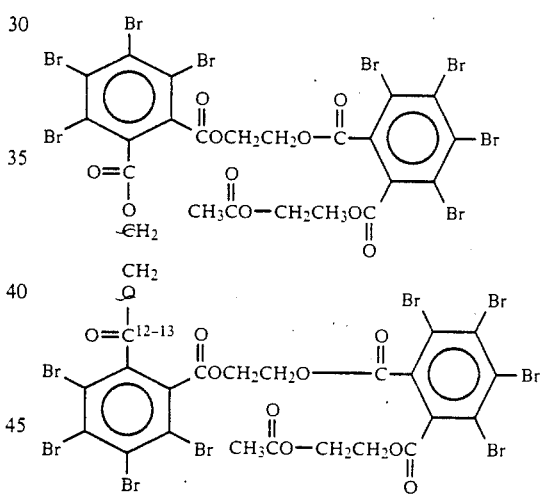

EXAMPLE 11

The compound below was prepared by the procedure outlined in Example 8 except that behenyl alcohol was used in place of poly(ethylene glycol 600). The product was a highly viscous liquid. Calcd. % Br, 46.6. Found % Br, 45.9. Analytical data was consistent with the following assigned structure:

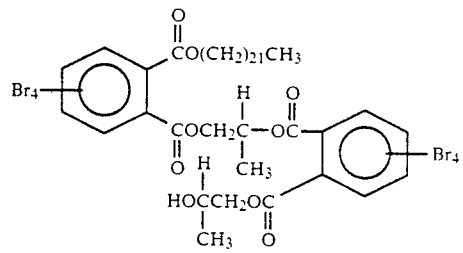

TEST EXAMPLES 12-23

In the following examples, the flame retardancy of the compositions of the present invention is demonstrated. The composition of the invention was prepared by mixing each of the compounds separately of Example 1-11 (12.7 parts), antimony oxide (2.5 parts) and a blend of 50% polyphenylene ether and 50% high impact polystyrene (84.8 parts) in a high speed mixer until the components were blended thoroughly. The compositions were then pressed into plaques which were cut up into strips measuring $4\frac{1}{2}"$ long $\times \frac{1}{4}"$ wide $\times \frac{1}{8}"$ thick on which Limited Oxygen Index (LOI) values were obtained according to the ASTM D2863-77 procedure. In Table I the LOI values are compared to a control consisting only of the polyphenylene ether-polystyrene blend.

TABLE I

| Composition Example No. | Test Compound Example No. | ASTM D2863-77 Flammability (LOI) |
| --- | --- | --- |
| 12 (control) |  | 23.8 |
| 13 | 1 | 30.0 |
| 14 | 2 | 29.8 |
| 15 | 3 | 29.8 |
| 16 | 4 | 30.4 |
| 17 | 5 | 31.8 |
| 18 | 6 | 31.3 |
| 19 | 7 | 31.8 |
| 20 | 8 | 31.3 |
| 21 | 9 | 31.3 |
| 22 | 10 | 30.4 |
| 23 | 11 | 30.9 |

The above results demonstrate the increased flame retardancy of the compositions of this invention relative to the control, as indicated by the 25-30% higher LOI values. LOI is a measure of the percentage of oxygen needed in the atmosphere to support burning of the material.

TEST EXAMPLES 24-35

In the following examples, compositions of this invention were prepared as described for Examples 12-23 except that the plaques were cut into strips measuring $4\frac{1}{2}"$ long $\times \frac{1}{2}"$ wide $\times \frac{1}{4}"$ thick on which the Underwriters' Laboratory Bulletin No. 94 (UL94) vertical test procedures were run. In Table II, the test results are compared to those of the control consisting of a blend of 50% polyphenylene ether and 50% high impact polystyrene.

TABLE II

| Composition Example No. | Test Compound Example No. | UL94 Total Burn Time (sec.) | UL94 Classification |
| --- | --- | --- | --- |
| 24 (control) |  | 159 | V-2 |
| 25 | 1 | 9 | V-0 |
| 26 | 2 | 12 | V-0 |
| 27 | 3 | 36 | V-1 |
| 28 | 4 | 12 | V-0 |
| 29 | 5 | 15 | V-0 |
| 30 | 6 | 5 | V-0 |
| 31 | 7 | 8 | V-0 |
| 32 | 8 | 15 | V-0 |
| 33 | 9 | 37 | V-0 |
| 34 | 10 | 10 | V-0 |
| 35 | 11 | 6 | V-0 |

The above results demonstrate the increased flame retardancy of the compositions of this invention relative to the control, as indicated by the significantly shorter burn times (after flame removed) and the lower UL classifications.

The present invention may be embodied in other specific forms without departing from the spirit or essential attributes thereof and, accordingly, reference should be made to the appended claims, rather than the specification, as indicating the scope of the invention.

We claim:

1. A flame retardant composition comprising a resin selected from the group consisting of polyphenylene ether, polyolefin, and blends of the foregoing with each other or with other resins, and an amount of a halogenated polyester effective to increase the flame retardancy of said resin, wherein said polyester is a halogenated phthalate ester of the formula:

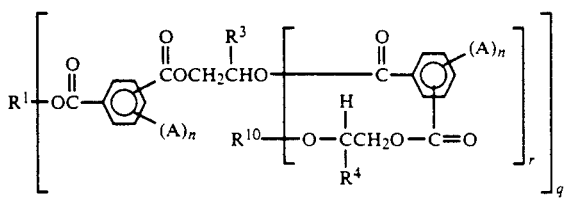

wherein
(a) the ring substituents can have all possible isomeric arrangements or positions;
(b) $R^1$ is selected from alkyl or substituted alkyl of 1 to 30 carbons, alkenyl or substituted alkenyl of 2 to 22 carbons, polyhydroxyalkyl of 3 to 12 carbons,

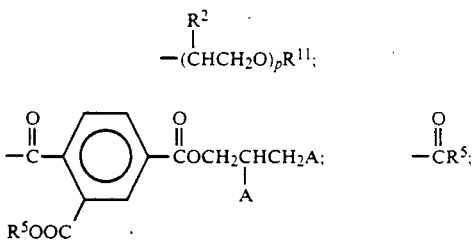

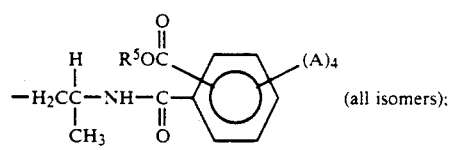

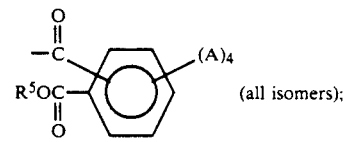

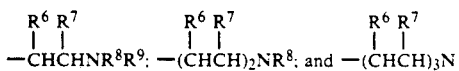

(c) $R^2$ is independently H or $CH_3$;
(d) $R^3$ and $R^4$ are independently hydrogen, $C_1$ to $C_{18}$ alkyl, which may optionally be substituted by halogen, —OH, —$OR^5$, or

(e) $R^6$, $R^7$, $R^8$ and $R^9$ are independently hydrogen or an alkyl group of 1 to 22 carbons;
(f) p is an integer of 0 to 50;
(g) q is an integer of 1 to 6;
(h) r is greater than 0 to about 50;
(i) A is Cl or Br;
(j) n=1 to 4;
(k) $R^{10}$ is hydrogen,

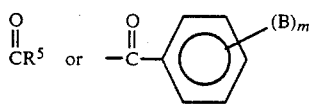

where B is halogen, $-OR^5$,

and m=1 to 5;
(l) $R^5$ is alkyl of 1 to 22 carbons; and
(m) $R^{11}$ is

or $R^5$, with the proviso that when p=0, $R^{11}$ is not $R^5$;
provided that when n=4, q=1, and $R^{10}$ is hydrogen, r is not one.

2. A composition according to claim 1, wherein said halogen is chlorine or bromine and said polyester contains at least about 25% by weight of bound halogen.

3. A composition according to claim 1, wherein said halogen is bromine and the polyester contains at least about 35% by weight of bound bromine.

4. A composition according to claim 1, wherein said resin is a polyolefin resin selected from the group consisting of polyethylene, polypropylene, ethylene-polypropylene copolymers, polyvinyl acetate, ethylene-vinyl acetate copolymers, polyvinyl alcohol, poly-4-methylpentene-1, polyisobutylene, acrylate ester polymers, methacrylate ester polymers and blends thereof.

5. A composition according to claim 1, wherein said resin is a polyolefin resin blended with a resin selected from the group consisting of polystyrene, styrene-butadiene copolymers, chlorinated polyethylene, polyvinyl chloride, acrylonitrile-styrene-butadiene terpolymers, polybutylene terephthalate, polyphenylene oxide-high impact polystyrene and mixtures thereof.

6. A composition according to claim 1, wherein said resin is a polyphenylene ether resin selected from the group consisting of polyphenylene ether homopolymers, polyphenylene ether copolymers, and blends of polyphenylene ether with a vinyl aromatic resin.

7. A composition according to claim 1, wherein said resin is a polyphenylene ether resin selected from the group consisting of:
(a) homopolymers having repeated structural units of the formula:

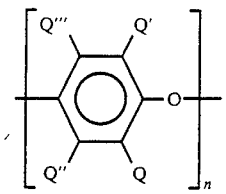

where Q, Q', Q'', and Q''' are independently hydrogen, hydrocarbon radicals, or halohydrocarbon radicals having at least two carbon atoms between the halogen atom and phenyl nucleus, or Q', Q'', and Q''' may be halogen, with the proviso that Q and Q' are free of tertiary carbon atoms, and n represents the total number of monomer units and is an integer of at least 10;

(b) copolymers having repeating structural units of the formula:

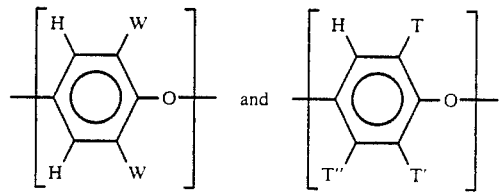

wherein W is independently methyl, Cl, Br, or I; and T, T' and T'' are independently alkyl of 1 to 3 carbons, aryl, alkaryl, haloaryl, or arylalkyl of 6 to 12 carbons; or (c) blends of (a) and/or (b) with (d) vinyl aromatic resins wherein at least 10% by weight of the blend is derived from a vinyl aromatic monomer of a compound having the formula:

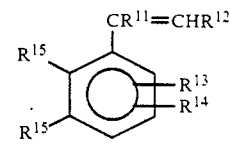

wherein $R^{11}$ and $R^{12}$ are independently lower alkyl or alkenyl groups of from 1 to 6 carbon atoms or hydrogen; $R^{13}$ and $R^{14}$ are independently chloro, bromo, hydrogen, or lower alkyl of from 1 to 6 carbon atoms; $R^{15}$ and $R^{16}$ are independently hydrogen or lower alkyl or alkenyl groups of 1 to 6 carbon atoms, or $R^{15}$ and $R^{16}$ may be concatenated together with hydrocarbyl groups to form a naphthyl group; or (e) copolymers of said vinyl aromatic monomer with moieties having the general formula:

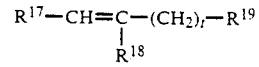

wherein $R^{17}$ and $R^{18}$ are independently hydrogen, halogen, alkyl of 1 to 4 carbon atoms, or carboalkoxy, or $R^{17}$ and $R^{18}$ taken together represent an anhydride linkage of the structure —COOOC—; and $R^{19}$ is hydrogen, vinyl, alkyl or alkenyl having 1 to 12 carbon atoms, cycloalkyl, carboalkoxy, alkoxy-alkyl, alkyl-carboxy, ketoxy, halogen, carboxy, cyano or pyridyl; and t is a whole number in the range of about 0 to 9.

8. A composition according to claim 1, wherein the weight ratio of resin to polyester is in the range of about 100:1 to about 2:1.

9. A composition according to claim 1, wherein the weight ratio of resin to polyester is in the range of about 20:1 to 4:1.

10. A composition according to claim 1, wherein said resin is a blend of polyphenylene ether homopolymer and a vinyl aromatic resin wherein at least 10% by weight of the blend is the vinyl aromatic resin.

11. A composition according to claim 1, wherein said resin is a polyphenylene ether resin selected from the group consisting of blends of polyphenylene ether homopolymer with polystyrene and blends of polyphenylene ether homopolymer with a copolymer of styrene and 1,3-butadiene.

12. A composition according to claim 1, wherein said resin is a polyphenylene ether homopolymer.

13. A composition according to claim 1, wherein $R^1$ is alkyl or substituted alkyl of 1 to 22 carbons or

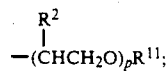

$R^3$ and $R^4$ are independently hydrogen, $-CH_3$, $-CH_2Cl$, $-C_2H_5$, $-C_4H_9$ or $-C_8H_{17}$; A is Br; p is 0 to 20; q is 1 to 6; r is 0.10 to 5; and n=2 to 4.

14. A composition according to claim 13, where $R^3$ and $R^4$ are independently hydrogen, $-CH_3$, or $-CH_2Cl$; q is 1; r is 0.25 to 2; and n=4.

15. A method of improving the flow characteristics and moldability during melt processing of a resin selected from the group consisting of polyphenylene ether, polyolefin, and blends of the foregoing with each other or with other resins, comprising blending with said resin an effective amount of a halogenated polyester of the formula:

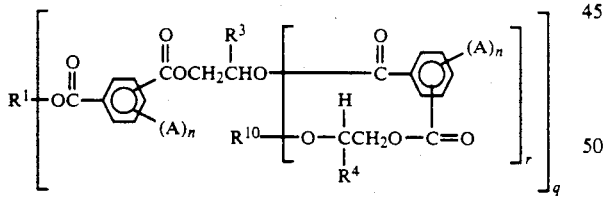

wherein
(a) the ring substituents can have all possible isomeric arrangements or positions;
(b) $R^1$ is selected from alkyl or substituted alkyl of 1 to 30 carbons, alkenyl or substituted alkenyl of 2 to 22 carbons, polyhydroxyalkyl of 3 to 12 carbons,

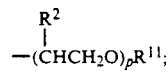

-continued

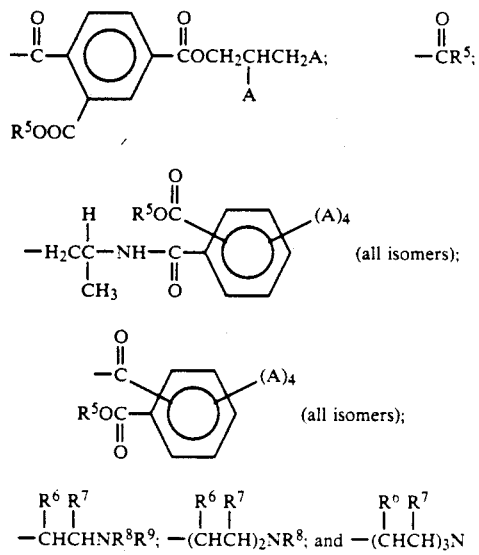

(c) $R^2$ is independently H or $CH_3$;
(d) $R^3$ and $R^4$ are independently hydrogen, $C_1$ to $C_{18}$ alkyl, which may optionally be substituted by halogen, $-OH$, $-OR^5$, or

(e) $R^6$, $R^7$, $R^8$ and $R^9$ are independently hydrogen or an alkyl group of 1 to 22 carbons;
(f) p is an integer of 0 to 50;
(g) q is an integer of 1 to 6;
(h) r is greater than 0 to about 50;
(i) A is Cl or Br;
(j) n=1 to 4;
(k) $R^{10}$ is hydrogen,

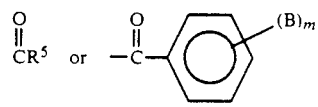

where B is halogen, $-OR^5$,

and m=1 to 5;
(l) $R^5$ is alkyl of 1 to 22 carbons; and
(m) $R^{11}$ is

or $R^5$, with the proviso that when p=0, $R^{11}$ is not $R^5$; provided that when n=4, q=1, and $R^{10}$ is hydrogen, r is not one.

* * * * *